(12) United States Patent
Hibiya et al.

(10) Patent No.: US 10,116,142 B2
(45) Date of Patent: Oct. 30, 2018

(54) LOAD CONTROL APPARATUS, PROGRAM, METHOD, AND SYSTEM

(71) Applicant: Panasonic Corporation, Kadoma-shi, Osaka (JP)

(72) Inventors: Shinpei Hibiya, Osaka (JP); Kiyotaka Takehara, Nara (JP); Hitoshi Nomura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 725 days.

(21) Appl. No.: 14/250,488

(22) Filed: Apr. 11, 2014

(65) Prior Publication Data

US 2014/0222237 A1    Aug. 7, 2014

Related U.S. Application Data

(63) Continuation of application No. PCT/JP2012/077512, filed on Oct. 24, 2012.

(30) Foreign Application Priority Data

Oct. 24, 2011   (JP) .................................. 2011-232563
Mar. 30, 2012  (JP) .................................. 2012-080774

(51) Int. Cl.
  *G05B 15/00*   (2006.01)
  *H02J 4/00*    (2006.01)
  (Continued)

(52) U.S. Cl.
  CPC ........ *H02J 4/00* (2013.01); *H02J 3/14* (2013.01); *H02J 3/28* (2013.01); *H02J 3/383* (2013.01);
  (Continued)

(58) Field of Classification Search
  CPC .................. H02J 4/00; H02J 3/14; H02J 3/28
  (Continued)

(56) References Cited

U.S. PATENT DOCUMENTS 4,370,723 A  *  1/1983  Huffman ............... H02J 3/14
                                                                307/35
2008/0147335 A1 *  6/2008  Adest ..................... G01D 4/004
                                                                702/64
(Continued)

FOREIGN PATENT DOCUMENTS

EP     2456036 A1 *  5/2012 .......... B60L 11/1816
EP     2477300 A1 *  7/2012 .......... H01M 10/441
(Continued)

OTHER PUBLICATIONS

International Search Report for PCT/JP2012/077512 dated Feb. 5, 2013.

*Primary Examiner* — Mohammad Ali
*Assistant Examiner* — Sheela S Rao
(74) *Attorney, Agent, or Firm* — Metrolexis Law Group, PLLC

(57) ABSTRACT

A load control apparatus receives information regarding the consumed electric power in load devices and the generated electric power by a power generator. The apparatus includes a control unit, which controls a device based on the received information. A determination unit determines whether the device can execute a predetermined process with surplus electric power in target period from the present until a predetermined period of time elapses. An execution unit controls the device such that when it is determined that the abovementioned process can be executed, a control signal is provided to cause the process to start.

18 Claims, 4 Drawing Sheets

(51) Int. Cl.
*H02J 3/14* (2006.01)
*H02J 3/28* (2006.01)
*H02J 3/38* (2006.01)
*H02J 7/35* (2006.01)
*H02J 3/00* (2006.01)

(52) U.S. Cl.
CPC ........... *H02J 7/35* (2013.01); *H02J 2003/003* (2013.01); *H02J 2003/143* (2013.01); *Y02B 70/3225* (2013.01); *Y02B 70/3266* (2013.01); *Y02E 10/563* (2013.01); *Y02E 10/566* (2013.01); *Y02E 70/30* (2013.01); *Y04S 20/222* (2013.01); *Y04S 20/242* (2013.01)

(58) Field of Classification Search
USPC .................................................. 700/291, 295
See application file for complete search history.

(56) References Cited

U.S. PATENT DOCUMENTS

| 2012/0016528 | A1* | 1/2012 | Raman | G06F 9/5094 700/291 |
| 2012/0078433 | A1 | 3/2012 | Honma et al. | |
| 2012/0150463 | A1* | 6/2012 | Ozawa | G05B 15/02 702/62 |
| 2012/0203387 | A1 | 8/2012 | Takayama et al. | |

FOREIGN PATENT DOCUMENTS

| JP | 2003-158825 A | 5/2003 |
| JP | 2006-158027 A | 6/2006 |
| JP | 2007-028036 A | 2/2007 |
| JP | 2007-295680 A | 11/2007 |
| JP | 2010-288375 A | 12/2010 |
| JP | 2011-061992 A | 3/2011 |
| JP | 2011-092002 A | 5/2011 |
| JP | 2012-172915 A | 9/2012 |
| WO | 2005/057982 A1 | 6/2005 |
| WO | 2011/007573 A1 | 1/2011 |
| WO | 2011/024366 A1 | 3/2011 |
| WO | 2011/030195 A1 | 3/2011 |

* cited by examiner

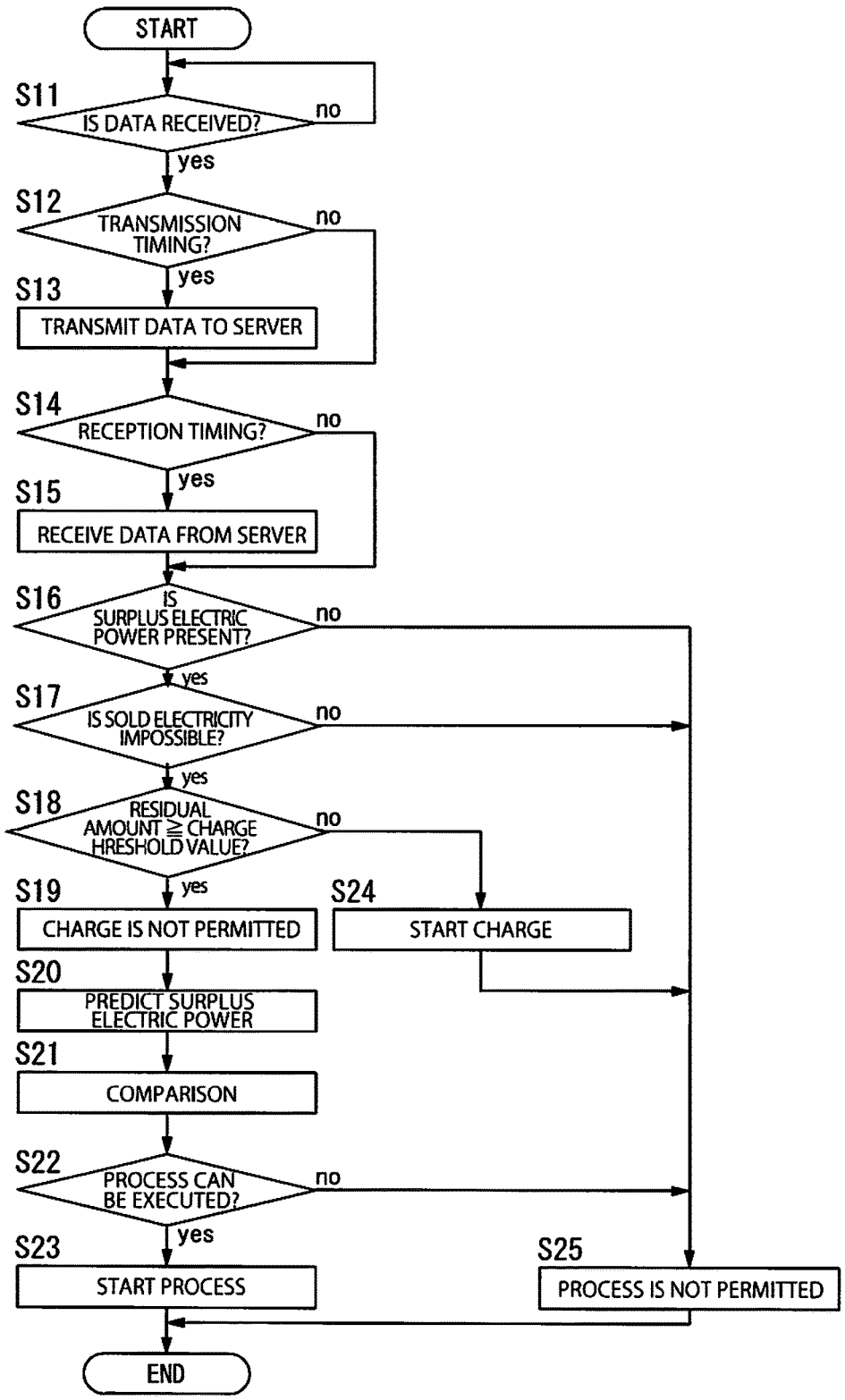

LOAD CONTROL APPARATUS, PROGRAM, METHOD, AND SYSTEM

CROSS REFERENCE TO RELATED APPLICATIONS

This application is a continuation application of PCT International Application No. PCT/JP2012/077512, filed on Oct. 24, 2012, entitled "LOAD CONTROLLER, PROGRAM, LOAD CONTROL SYSTEM", which claims priority based on Article 8 of Patent Cooperation Treaty from prior Japanese Patent Applications Nos. 2011-232563, filed on Oct. 24, 2011 and 2012-080774, filed on Mar. 30, 2012, the entire contents of which are incorporated herein by reference.

TECHNICAL FIELD

The disclosure relates to a load controller, a program, a load control system, which operates a load device using the surplus electric power in a power generator.

BACKGROUND ART

Conventionally, a power generator such as a solar cell or a fuel cell is installed in a consumer's home so that the power generator covers a part of the necessary electric power in the consumer's home. For example, in Japan, if the power generator is a solar cell, when the surplus electric power is generated (the generated electric power by the solar cell is more than the consumed electric power in a load device), the surplus electric power by the solar cell is generally caused to reversely flow to a commercial power system and is sold to an electric power company.

Further, with a further widespread use of solar cells from now on, there is a view that power selling is to be regulated from the viewpoint of stabilizing the electric power in commercial power systems. It is considered that the surplus electric power generated by consumers cannot be freely sold from now on. Moreover, it is also considered that a significant drop of a unit price of the power selling reduces a merit by the power selling. In such a case, it is possible to install a storage battery in a consumer's home to store the surplus electric power therein (power storage). However, there is a problem in that a burden on the consumer due to the introduction of the storage battery is increased or if the storage battery is fully charged, the electric power cannot be stored any more.

With regard to the problem, as a system which effectively utilizes the surplus electric power other than a method of the power selling or the power storage, proposed is a system in which the surplus electric power is used for an operation of a (hot water storage type) hot water supply device (see, Japanese Patent Application Publication 2006-158027). In the system, if the generated electric power possibly has the surplus electric power, a value of the minimum amount of thermal storage of the hot water supply device is increased. In this time, if the actual amount of thermal storage of the hot water supply device is less than the minimum amount of thermal storage, the hot water supply device is operated with the generated electric power by a power generator to boil additional hot water.

However, when the surplus electric power is used for an operation of a certain load device (for example, hot water supply device) as described above, if the surplus electric power is run out after the load device starts a certain process and before the process is completed, the following problem might be caused.

Specifically, in a case where a hot water supply device starts a process of boiling a predetermined amount of hot water, if the surplus electric power is run out before completion of the process (completion of boiling), the process of boiling hot water is finished in the course thereof. As a result, the hot water supply device repeatedly starts and finishes the process every time the surplus electric power is generated. This results in the worsened utilization efficiency of the surplus electric power, compared with a case where the same process is completed at one time.

Alternatively, it can be considered that when the surplus electric power is run out before completion of the process, the hot water supply device receives electric power supply from a commercial power system in order to continue the process. However, regardless of starting boiling hot water for utilizing the surplus electric power, a consumer is forced to purchase the electric power eventually. Accordingly, in some cases, a process (hot water boiling), which may be originally executed at midnight when a unit price of power purchasing is cheap is started during the daytime. This causes a consumer to be forced to purchase the electric power during the daytime when the unit price is expensive, and thus the consumer might experience a financial loss.

SUMMARY OF INVENTION

The invention is made in view of the abovementioned problem, and aim to provide a load control apparatus, a program, and a load control system which can prevent a disadvantage due to the surplus electric power being run out after the load device starts a predetermined process with the surplus electric power and before completing the process.

A load control apparatus according to one or more embodiments is a load control apparatus used in a power supply system in which a power generator supplies electric power to a load device, and when electric power generated in the power generator is insufficient, a commercial power system supplies electric power to the load device, the load control apparatus including: a controller configured to receive information regarding consumed electric power in the load device and generated electric power by the power generator and to control an operation of a controlled device included in the load device on the basis of the received information, and wherein the controller includes: a determination unit configured to determine whether the controlled device can execute a predetermined process with surplus electric power in a target period from the present until a predetermined period of time elapses; and an execution unit configured to control the operation of the controlled device to start the process, when the determination unit determines that the process can be executed.

With the embodiment above, there is an advantage in that a disadvantage due to the surplus electric power being run out after the load device starts a predetermined process with the surplus electric power and before completing the process can be prevented.

In the load control apparatus, according to one possible implementation, the load control apparatus may further includes a measurement unit configured to measure consumed electric power in the load device and generated electric power by the power generator and to provide a measurement result to the controller.

In the load control apparatus, according to one possible implementation, the determination unit may compare electric power and time necessary after the controlled device starts the predetermined process and before completing a prediction result.

In the load control apparatus, according to one possible implementation, the controller may further include a prediction unit configured to predict the surplus electric power generated in the target period, the surplus electric power being a difference between the generated electric power and the consumed electric power when the generated electric power is more than the consumed electric power. The determination unit may compare electric power and time necessary after the controlled device starts the process and before completing with a prediction result by the prediction unit.

In the load control apparatus, according to one possible implementation, the process is a process to be started and completed within a constant fixed period of time, and the prediction unit predicts, for the every fixed period of time, a period from the present until the fixed period of time elapses as the target period, the surplus electric power in the target period, and the determination unit compares, for the every fixed period of time, the electric power necessary for the process in the controlled device with the prediction result by the prediction unit.

In the load control apparatus, according to one possible implementation, the prediction unit may predict, for every unit time shorter than the time required from the start of the process to the completion thereof, the surplus electric power in the target period, and the determination unit compares, for the every unit time, the electric power necessary for the process in the controlled device with the prediction result by the prediction unit.

In the load control apparatus, according to one possible implementation, the determination unit may obtain the electric power necessary for the process in the controlled device, using a history of the electric power used by the controlled device for the latest process.

In the load control apparatus, according to one possible implementation, the measurement unit may measure the electric power supplied from the commercial power system to the load device as purchased electric power. And the controller may further include a process stop unit configured to stop the process when the purchased electric power exceeds a predetermined threshold value of power purchasing while the controlled device is executing the process in accordance with the control signal from the execution unit.

In the load control apparatus, according to one possible implementation, the controlled device may include a manipulation unit configured to receive a manipulation input for staring the process. When the controlled device starts the process in accordance with the manipulation in the manipulation unit, the controller may not perform the determination in the determination unit before the process is completed.

In the load control apparatus, according to one possible implementation, the power supply system may be provided with a power storage device configured to store therein the generated electric power by the power generator. The measurement unit measures a residual amount of the power storage device. And the controller may further include a charge controller configured to control, when the residual amount of the power storage device is less than a predetermined charge threshold value and the surplus electric power is generated, the power storage device to charge the power storage device with the surplus electric power, and performs the prediction in the prediction unit and the determination in the determination unit when the residual amount of the power storage device is equal to or more than the charge threshold value.

In the load control apparatus, according to one possible implementation, the prediction unit may predict the surplus electric power generated in the target period using a history of the generated electric power in a fixed period in the past.

In the load control apparatus, according to one possible implementation, the prediction unit may predict the surplus electric power generated in the target period using a history of the generated electric power and a history of the consumed electric power in a fixed period in the past.

In the load control apparatus, according to one possible implementation, the load control apparatus may further include a communication unit configured to communicate with a server. The power generator includes a solar cell. The prediction unit my aquire weather information in the target period from the server via the communication unit, and predicts the surplus electric power generated in the target period using generated electric power by the solar cell in the target period predicted from the weather information.

In the load control apparatus, according to one possible implementation, the load control apparatus may further include a communication unit configured to communicate with a serve. The power generator includes a solar cell. A measurement unit stores the history of the generated electric power and the history of the consumed electric power measured in the past in association with weather information in the server, and the prediction unit acquires, from the server via the communication unit, the history of the generated electric power and the history of the consumed electric power corresponding to the weather information in the target period, and predicts the surplus electric power generated in the target period on the basis of the histories.

A program for a computer in a power supply system according to one or more embodiments is a program stored in a recording medium and used for a computer in a power supply system in which a power generator supplies electric power to a load device, and when electric power generated in the power generator is insufficient, a commercial power system supplies electric power to the load device, the computer being used to control an operation of a controlled device included in the load device on the basis of information regarding consumed electric power in the load device and generated electric power by the power generator, the program, when executed by the computer, causing the computer to function as: a determination unit configured to determine whether the controlled device can execute a predetermined process with surplus electric power in a target period from the present until a predetermined period of time elapses; and an execution unit configured to control the operation of the controlled device to start the process, when the determination unit determines that the process can be executed.

A load control system according to one or more embodiments is a load control system includes the load control apparatus described above; and the controlled device.

A load control method according to one or more embodiments is a load control method, including: receiving information regarding consumed electric power in a load device and generated electric power by a power generator; determining whether a controlled device can execute a predetermined process with surplus electric power in a target period from the present until a predetermined period of time elapses; and controlling the operation of the controlled device to start the process, when a determining result of the determining step is that the process can be executed.

In the load control method, according to one possible implementation, the controlled device may be an electric type hot water supply device, and the process is a process for boiling a predetermined amount of hot water.

In the load control method, according to one possible implementation, the controlled device may be a charging device configured to charge a storage battery, and the process is a process for accumulating a predetermined amount of electric energy.

In the load control method, according to one possible implementation, the process may be a process to be started and completed within a constant fixed period of time. The method may further include predicting the surplus electric power generated in the target period, the surplus electric power being a difference between the generated electric power and the consumed electric power when the generated electric power is more than the consumed electric power. The predicting step predicts, for the every fixed period of time, a period from the present until the fixed period of time elapses as the target period, the surplus electric power in the target period, and the comparing step compares, for the every fixed period of time, the electric power necessary for the process in the controlled device with the prediction result output by the prediction step. And the determining step compares electric power and time necessary after the controlled device starts the process and before completing with a prediction result by the predicting step.

BRIEF DESCRIPTION OF DRAWINGS

FIG. 4 is an explanation view illustrating an operation of a control unit in a load control apparatus according to the second embodiment.

DETAILED DESCRIPTION (First Embodiment)

Figure 1:
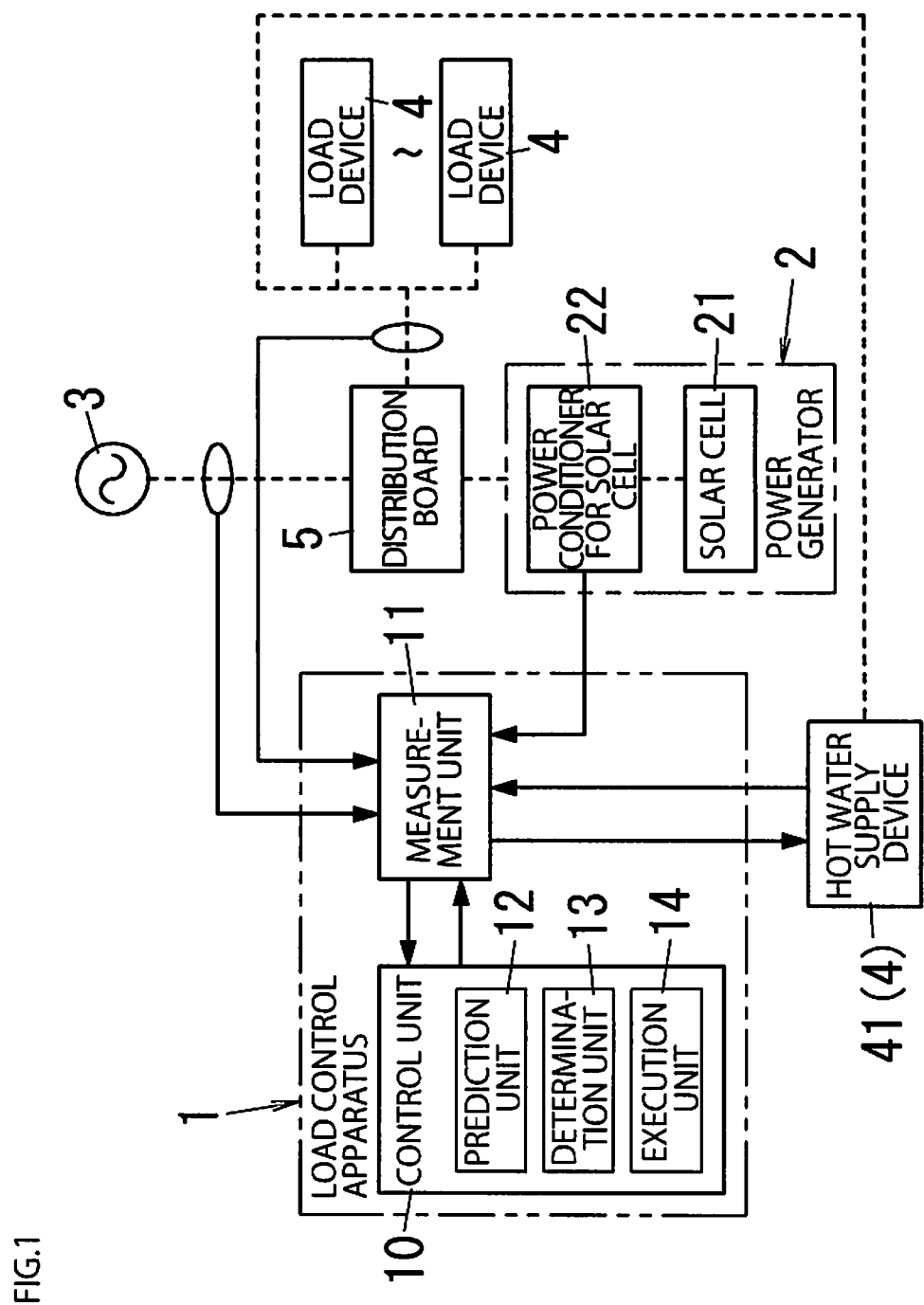
FIG. 1 is a schematic configuration block diagram illustrating a power supply system according to a first embodiment.

Load control apparatus 1 in an embodiment is used, as illustrated in FIG. 1, in a power supply system provided with power generator 2. In the power supply system, power generator 2 is interconnected to commercial power system 3, power generator 2 supplies electric power to load devices 4 in a consumer, and when the generated electric power by power generator 2 is insufficient, commercial power system 3 supplies electric power to load device 4. In an example of FIG. 1, a controlled device to be a control target of load control apparatus 1 is hot water supply device 41 of an electric type, and hot water supply device (controlled device) 41 is one of multiple load devices 4 to be a target of electric power supply from power generator 2 or commercial power system 3, in the power supply system.

Although an example in which the power supply system is introduced into a consumer's home such as a general single-family house is described here, the invention is not limited to this example, the power supply system may be introduced into an individual dwelling unit in a collective housing, facilities, factories, and the like. Further, in FIG. 1, a connection line in a heavy-current system in which electric power is exchanged is illustrated as a dashed line, and a connection line in a weak-current system in which information (signal) is exchanged is illustrated as a solid line.

Power generator 2 includes solar cell 21, which utilizes natural energy (solar light) to generate direct-current power, and power conditioner (illustrated in FIG. 1 as "POWER CONDITIONER FOR SOLAR CELL") 22 for a solar cell, which is inserted between solar cell 21 and distribution board 5. Solar cell 21 basically performs power generation during the daytime and stops the power generation during the night because the generated electric power varies in accordance with the amount of solar radiation.

Power conditioner 22 includes an inverter circuit (not illustrated), which converts the direct-current power from solar cell 21 into alternating-current power synchronized with the phase of commercial power system 3. An output of power conditioner 22 is connected to distribution board 5, which is installed in the house and is connected with load devices 4, and the generated electric power by solar cell 21 is supplied to load devices 4 via power conditioner 22 and distribution board 5. Distribution board 5 is also connected to commercial power system 3. When the generated electric power by power generator 2 is not enough to cover the total consumed electric power of load devices (in other words, in a case "the generated electric power<the consumed electric power"), commercial power system 3 supplies electric power to load devices 4.

In addition, when the surplus amount of the generated electric power by solar cell 21 (hereinafter, referred to as "the surplus electric power") is generated, power conditioner 22 has a function of selling the surplus electric power to an electric power company by a reverse power flow of the surplus electric power to commercial power system 3. The surplus electric power herein is the difference between the generated electric power and the consumed electric power when the generated electric power by power generator 2 is more than the consumed electric power consumed in load devices 4, in other words, the electric power obtained by subtracting the consumed electric power in load devices 4 from the generated electric power by power generator 2. Moreover, power conditioner 22 stops the operation of the inverter circuit when detecting power failure of commercial power system 3, and includes a protection device (not illustrated), which is inserted between distribution board 5 and power conditioner 22 and makes a parallel-off relay (not illustrated) to be parallel off, and prevents an isolated operation of solar cell 21.

Commercial power system 3 is a single phase three wire system, and is drawn into a house through an incoming line (not illustrated) including three lines of a neutral electrode and a pair of voltage electrodes to be connected to distribution board 5. Distribution board 5 stores therein a master breaker (not illustrated), a plurality of branch breakers (not illustrated), and the like, and load devices 4 are connected to the respective branch breakers.

Load device 4 includes, in addition to hot water supply device 41, electric devices such as a television receiver, a music player, and a personal computer, wiring accessories such as a plug socket and a wall switch, facility appliances such as an air-conditioner, and an illumination device, and the like, which are disposed in various places in the house. Although the load devices 4 described herein are alternating-current drive type devices, which operate by receiving alternating-current power supply, load devices 4 may include a direct-current drive type device which operates by receiving direct-current power supply.

Hot water supply device 41, together with other load devices 4, is connected to the branch breakers of distribution board 5, and operates by receiving electric power supply from power generator 2 or commercial power system 3. Hot water supply device 41 includes a hot water storage tank (not illustrated) which stores therein hot and cold water and a heat device (not illustrated) which heats the hot and cold water stored in the hot water storage tank, and is a hot water supply device of a hot water storage type which supplies the hot and cold water in the hot water storage tank. The heat device employs a heat pump system, and is installed outside the house with the hot water storage tank.

Hot water supply device 41 of this type is well known, and thus a detail explanation is omitted for sake of brevity. The hot water storage tank employs the heat insulated structure and the inside thereof is filled with hot and cold water all the time, and hot and cold water supplied from a bottom portion (water supply port) and heated is returned from an upper portion. Accordingly, inside the hot water storage tank, the temperature of the hot and cold water becomes higher toward the upper portion. Therefore, hot water supply device 41 detects, on the basis of outputs from multiple temperature sensors (not illustrated) vertically disposed in the hot water storage tank, a position from the upper end in the hot water storage tank where the hot and cold water reaches a predetermined temperature (for example, 90° C.), and determines the amount of residual hot water. Further, the amount of residual hot water herein means the amount of hot water at a predetermined temperature or higher, among the hot and cold water in the hot water storage tank.

Load control apparatus 1 is provided with, as illustrated in FIG. 1, control unit 10 constituting a controller which controls an operation of hot water supply device 41 as a controlled device, and measurement unit 11 constituting a measurement unit which measures the consumed electric power in load devices 4 and the generated electric power by power generator 2. Load control apparatus 1 constitutes a load control system with a controlled device (herein, hot water supply device 41).

In the embodiment, control unit 10 and measurement unit 11 are configured to be separated from and to be able to communicate with each other. However, load control apparatus 1 is not limited to this configuration but may be provided with the controller and the measurement unit in a single housing.

Measurement unit 11 measures, by using output from a current sensor provided on a power supply passage from distribution board 5 to load devices 4, an instantaneous value of electric power actually consumed in load device 4 (an achievement value of the consumed electric power) on a periodic basis. In addition, measurement unit 11 communicates with power conditioner 22 in power generator 2 to acquire, in addition to the generated electric power by power generator 2, information such as the specifications, errors (abnormality), or the like, of solar cell 21 and power conditioner 22, from power conditioner 22. Here, as for the generated electric power by power generator 2, measurement unit 11 measures an instantaneous value of electric power actually generated in solar cell 21 (an achievement value of the generated electric power).

Moreover, in the embodiment, measurement unit 11 also acquires the sold or purchased electric power which is given to and received from commercial power system 3 (power selling, power purchasing), and device information relating to hot water supply device 41, on a periodic basis. As for the sold or purchased electric power, measurement unit 11 measures, by using output from a current sensor provided on a power supply passage between commercial power system 3 and distribution board 5, an instantaneous value of electric power actually given to and received from commercial power system 3 (achievement value of sold or purchased electric power), on a periodic basis. As for the device information on hot water supply device 41, measurement unit 11 communicates with hot water supply device 41 to directly acquire information such as the amount of residual hot water in hot water supply device 41, the specification and an error (abnormality) of hot water supply device 41, or the like, from hot water supply device 41.

In this manner, measurement unit 11 is configured to be able to communicate with hot water supply device 41 and power conditioner 22, and measurement unit 11 also transmits, to hot water supply device 41, a control signal, which is described later in details, for controlling hot water supply device 41 by control unit 10.

Measurement unit 11 stores data (measurement results and the like) acquired on a periodic basis in the manner described above in a memory (not illustrated) as a management table of a form as Table 1 below. Here, in addition to the data (measurement results and the like) acquired by measurement unit 11, data of accumulated values obtained by subjecting simple calculation to the data is also housed in the management table. Measurement unit 11 transmits data in the management table to control unit 10 on a periodic basis. Further, in Table 1, "master electric power" represents the sold or purchased electric power with commercial power system 3, and "power consumption in load device 1" to "power consumption in load device N" represent the consumed electric power in respective load devices 4.

TABLE 1

| | |
|---|---|
| Instantaneous value of master electric power | 500 W |
| Instantaneous value of power consumption in load device 1 | 200 W |
| . . . | . . . |
| Instantaneous value of power consumption in load device N | 200 W |
| Instantaneous value of generated electric power | 1 kW |
| Accumulated value of master electric power (power purchasing) | 4 kW |
| Accumulated value of master electric power (power selling) | 0 kW |
| Accumulated value of power consumption in load device 1 | 1.6 kW |
| . . . | . . . |
| Accumulated value of power consumption in load device N | 1.6 kW |
| Accumulated value of generated electric power | 8 kWh |
| Amount of stored hot water in hot water supply device | 400 L |

Control unit 10 controls, on the basis of data (measurement results and the like) received from measurement unit 11, an operation of hot water supply device 41 as a controlled device by a control signal. Specifically, control unit 10 includes prediction unit 12 which predicts the surplus electric power in the future using a measurement result by measurement unit 11, determination unit 13 which determines propriety of causing hot water supply device 41 to execute a predetermined process with the surplus electric power, and execution unit 14 which actually controls hot water supply device 41. In the embodiment, control unit 10 includes a microcomputer as a main component, and implements functions of the respective units by executing programs stored in a memory (not illustrated).

Prediction unit 12 predicts, using the measurement result by measurement unit 11, the surplus electric power (generated electric power−consumed electric power) generated in power generator 2 in a target period from the present until a predetermined period of time (for example, one hour) elapses. In other words, prediction unit 12 predicts a generation status of the surplus electric power in the target period in the future, which is after the predetermined period of time from the present. Here, prediction unit 12 predicts the surplus electric power in the target period, on the basis of the present instantaneous values of the consumed electric power and the generated electric power among the measurement results by measurement unit 11, by combining the current time, the past history, or the like with the present instantaneous values.

In the embodiment, control unit 10 stores therein, using data from measurement unit 11, a history of the generated electric power and a history of the consumed electric power in accordance with the time series in a fixed period in the past (for example, one week) as history information. Prediction unit 12 predicts the surplus electric power using the history information. The surplus electric power corresponds to a difference between the generated electric power and the consumed electric power when the generated electric power is more than the consumed electric power as surplus electric power. In other words, control unit 10 stores therein the generated electric power and the consumed electric power for every unit time (for example, ten minutes) as history information. Prediction unit 12 obtains, using history information in a time band the same as the target period, a tendency of changes in the generated electric power and the consumed electric power for the abovementioned unit time. Prediction unit 12 applies the tendency of changes obtained in this manner to the present consumed electric power and the present generated electric power to predict the surplus electric power in the target period for every unit time.

Moreover, the prediction method described above of the surplus electric power is merely an example. Prediction unit 12 can predict the surplus electric power, for example, only using information on the history of the generated electric power if the consumed electric power does not vary largely, or can predict the surplus electric power by combining information such as the current temperature or humidity.

Determination unit 13 compares the electric power and the time necessary after the hot water supply device 41 as the controlled device starts a predetermined process and before completing with a prediction result by prediction unit 12 to determine whether hot water supply device 41 executes the abovementioned process with the surplus electric power in a target period. A process to be a determination target in determination unit 13 (hereinafter, referred to as "target process") can be a process which needs a certain period of time from the start to the completion, and in the embodiment, as an example, the target process is an additional boiling process that hot water supply device 41 boils a predetermined amount of hot water. For example, assuming one hour is required for a target process for boiling 100 L of hot water by hot water supply device 41 with the electric power of 450 W consumed all the time, determination unit 13 determines whether the target process can be performed depending on whether or not the surplus electric power of 450 W or more is secured over the next one hour.

In other words, determination unit 13 determines as to whether or not the electric power necessary for a target process in hot water supply device 41 can be secured from the start to the completion of the target process, within the surplus electric power in the target period predicted by prediction unit 12. Further, the amount of hot water boiled through the target process is decided as appropriate depending on the present amount of residual hot water and the specification of hot water supply device 41 acquired by measurement unit 11, is not limited to 100 L but may be, for example, 200 L or 300 L. For example, when the amount of residual hot water in a storage tank with the capacity of 460 L of hot water is 300 L, determination unit 13 determines a process of boiling 100 L of hot water as a target process.

Further, the prediction result by prediction unit 12 is merely a prediction, and is different from the actual surplus electric power. Therefore, determination unit 13 sets a value to which predetermined margin is added to a value of electric power necessary for the target process as an electric power threshold value, and compares the electric power threshold value with the prediction result by prediction unit 12 (the surplus electric power) to determine as to whether or not the electric power necessary for the target process can be secured. In other words, in the abovementioned example in which a process for boiling 100 L of hot water is set as a target process, determination unit 13 sets, for example, an electric power threshold value to 500 W, and compares the surplus electric power every unit time in the target period predicted by prediction unit 12 with the electric power threshold value (500 W). In this time, if the prediction result by prediction unit 12 (the surplus electric power) is, for example, 600 W, which is the electric power threshold value (500 W) or more in all the unit times in the target period, determination unit 13 determines that electric power necessary for the target process can be secured all the time and the target process can be executed.

Herein, the length of a target period and a time interval (unit time) at which prediction unit 12 predicts the surplus electric power are set with reference to the required time from the start to the completion of the target process. A time interval at which determination unit 13 compares the electric power necessary for the target process with the prediction result by prediction unit 12 is the same unit time at which prediction unit 12 predicts the surplus electric power.

The length of the target period is set to time required from the start to the completion of the target process or longer, and the unit time is set sufficiently shorter than the time required from the start to the completion of the target process. As for the abovementioned target process of boiling 100 L of hot water as an example, the target period is set to, for example, one hour, and the unit time is set to, for example, ten minutes. In short, prediction unit 12 predicts the surplus electric power during one hour from the present for every ten minutes. In this case, determination unit 13 compares the electric power necessary for the target process in hot water supply device 41 with the prediction result by prediction unit 12 during one hour from the present for every ten minutes. Note that the target period is not limited to one hour but can be set arbitrarily, for example, twelve hours, twenty-four hours, forty-eight hours, or the like, and the unit time is also not limited to ten minutes but can be set arbitrarily, for example, one minute, five minutes, thirty minutes, or the like.

Execution unit 14 actually controls, when determination unit 13 determines that the target process can be executed, an operation of hot water supply device 41 by a control signal such that transmitting the control signal to hot water supply device 41 causes the target process to be started. In other words, if determination unit 13 determines that the electric power necessary for the target process in hot water supply device 41 can be secured from the start to the completion of the target process, execution unit 14 transmits a control signal for instructing start of a process to hot water supply device 41 to cause hot water supply device 41 to start the target process. In contrast, if determination unit 13 determines that the target process cannot be executed, execution unit 14 transmits a control signal for instructing non-permission of a process to hot water supply device 41 to prohibit the target process in hot water supply device 41.

Further, in the embodiment, because control unit 10 is connected to hot water supply device 41 via measurement unit 11, execution unit 14 in control unit 10 transmits a control signal to measurement unit 11, and measurement unit 11 transmits the control signal to hot water supply device 41. In other words, execution unit 14 transmits a control signal to hot water supply device 41 by way of measurement unit 11.

Hot water supply device 41 having received a control signal from load control apparatus 1 determines as to whether or not to execute a target process in accordance with the content of the control signal. Upon reception of a control signal for start of a process, hot water supply device 41 starts the target process. While, upon reception of a control signal for non-permission of a process, hot water supply device 41 is shifted to a non-permission mode in which the target process is prohibited. In the non-permission mode, hot water supply device 41 displays the fact that the target process is prohibited on a hot-water supply controller (not illustrated) installed in the house, and even if a user performs an operation of instructing the target process (additional boiling process of the predetermined amount) using the hot-water supply controller, hot water supply device 41 does not execute the target process. In other words, in the embodiment, load control apparatus 1 not only can cause hot water supply device 41 to execute a process by a control signal for a process start but also can cause hot water supply device 41 to positively prohibit a process by control signal for non-permission of a process.

With the abovementioned configuration, when the surplus electric power is generated in the generated electric power by power generator 2, load control apparatus 1 can effectively utilize the surplus electric power by causing hot water supply device 41 to be operated with the surplus electric power.

Moreover, in the embodiment, upon reception of data from measurement unit 11, control unit 10 firstly determines, before prediction of the surplus electric power in prediction unit 12 and determination of execution propriety in determination unit 13, the presence or absence of the current surplus electric power on the basis of the measurement result by measurement unit 11. In this time, if determining that the surplus electric power is present (in other words, generated electric power>consumed electric power), control unit 10 successively determines as to whether or not power selling to an electric power company is possible. Only after determining that power selling is impossible, control unit 10 shifts to the prediction in prediction unit 12 and the determination in determination unit 13. In other words, when the surplus electric power is generated, load control apparatus 1 in the embodiment gives higher priority to the power selling than hot water supply device 41, as a method of utilizing the surplus electric power.

Figure 2:
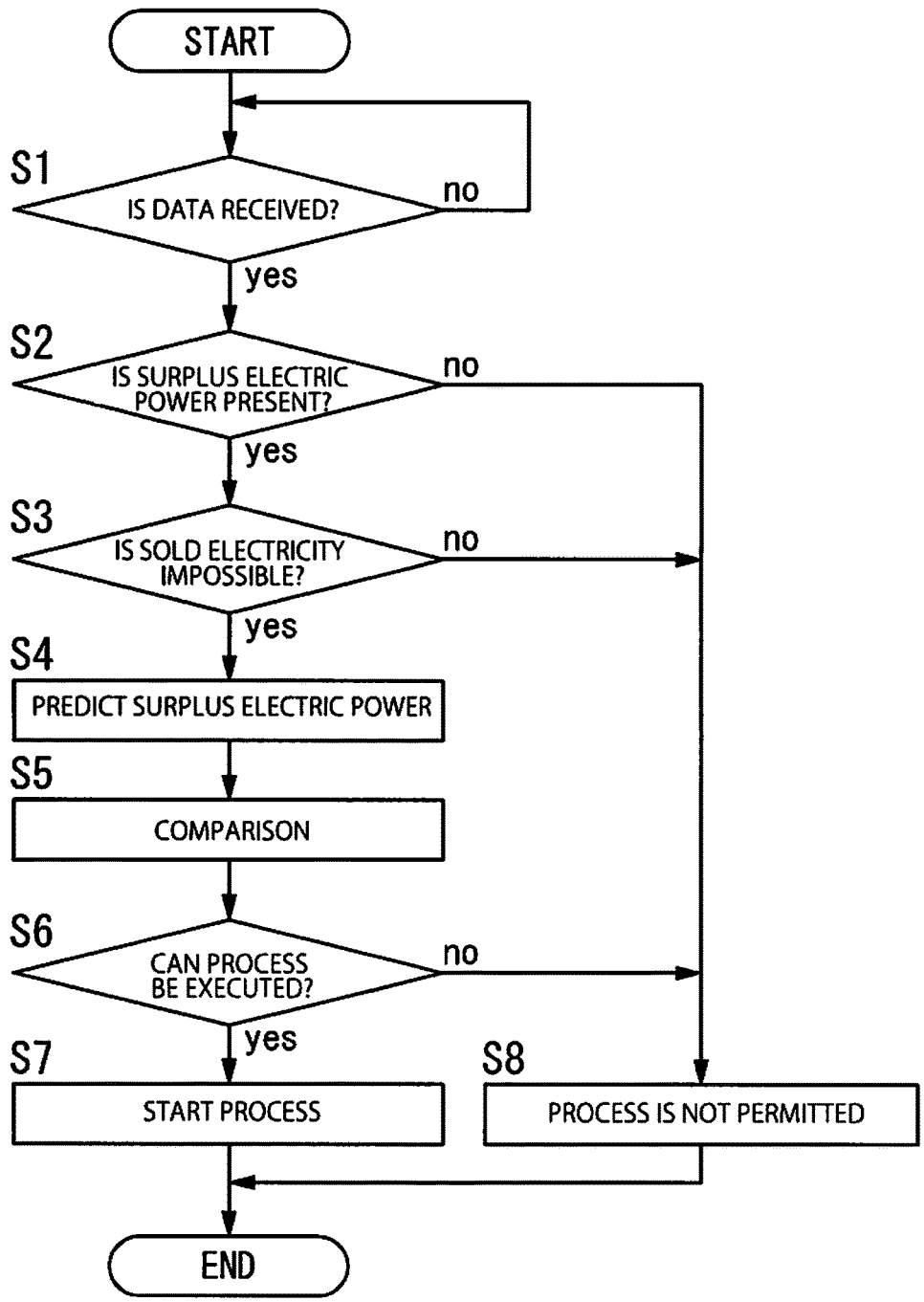
FIG. 2 is an explanation view illustrating an operation of a control unit in a load control apparatus according to the first embodiment.

Next, an operation of control unit 10 of the configuration described above is described with reference to FIG. 2.

Upon reception of data of from measurement unit 11 (S1: yes in FIG. 2), control unit 10 firstly determines, on the basis of the data (measurement result), the presence or absence of the current surplus electric power (S2). In this time, for example, if the generated electric power is more than the consumed electric power, such as a case where the consumed electric power is 1.9 kW and the generated electric power is 2.5 kW, control unit 10 determines that the surplus electric power is present (S2: yes), and successively determines propriety of power selling to an electric power company (S3).

Control unit 10 determines that power selling is impossible when the supply voltage (system voltage) from the electric power company is high to prevent the output voltage of power conditioner 22 from exceeding the system voltage (voltage rise suppression problem) or when power generation is regulated due to a request from the electric power company (S3: yes). If the determining is such that the power selling is impossible (S3: yes), control unit 10 predicts the surplus electric power to be generated a target period in the future for every unit time, in prediction unit 12 (S4). Control unit 10 then compares the necessary electric power for every unit time after hot water supply device 41 starts the target process and before completing with the prediction result by prediction unit 12 (S5), and determines propriety that hot water supply device 41 executes the target process with the surplus electric power in the target period, in determination unit 13 (S6).

In this time, for example, as in a case where the surplus electric power is 600 W and the electric power threshold value is 500 W, if the prediction result by prediction unit 12 (the surplus electric power) is equal to or more than an electric power threshold value over the target period, control unit 10 determines that the target process can be executed, in determination unit 13 (S6: yes). In this case, control unit 10 transmits a control signal for start of the process from execution unit 14 hot water supply device 41 by way of measurement unit 11 (S7).

In contrast, if determining that no surplus electric power is present at S2 (S2: no), if the determining is such that the power selling is possible at S3 (S3: no), or if the determining is such that the target process cannot be executed at S6 (S6: no), control unit 10 transmits a control signal for non-permission of the process to hot water supply device 41 (S8). Control unit 10 repeatedly executes the abovementioned S1 to S8.

With load control apparatus 1 explained above, determination unit 13 determines, using the surplus electric power in the feature (the target period) predicted by prediction unit 12, propriety that hot water supply device (controlled device) 41 executes a target process with the surplus electric power. Accordingly, load control apparatus 1 can prevent the surplus electric power from being run out in the middle of the target process. In other words, load control apparatus 1 executes a target process when it is determined that the necessary electric power from the start to the completion of the target process can be secured with the surplus electric power to be predicted in the target period. Accordingly, load control apparatus 1 can prevent the surplus electric power from being run out after hot water supply device 41 starting the target process and before completing. Therefore, hot water supply device 41 as the controlled device can prevent from repeatedly starting and finishing a target process every time when the surplus electric power is generated, or disadvantages (the worsened utilization efficiency of electric power or a loss by power purchasing) caused by receiving electric power supply from commercial power system 3 in order to continue the target process.

In other words, load control apparatus 1 effectively utilizes the surplus electric power for operating a controlled device by shifting start timing of a process of the controlled device, which needs a certain period of time from the start to the completion in accordance with the generation status of the surplus electric power predicted by prediction unit 12. In particular, in the embodiment, the controlled device is hot water supply device 41 and the surplus electric power is utilized for the additional boiling process of the predetermined amount of hot water. Accordingly, the start timing of the additional boiling process normally scheduled during the night can be moved up during the daytime when the surplus electric power is generated. Therefore, during the night when execution of the additional boiling process is originally scheduled, margin of the electric power is generated by the electric power for the additional boiling process, which becomes unnecessary.

Moreover, in the embodiment, the unit time as a time interval when prediction unit 12 predicts the surplus electric power, that is a time interval when determination unit 13 compares the electric power necessary for the target process with the prediction result by prediction unit 12, is set sufficiently shorter than the time required from the start to the completion of the target process. This allows load control apparatus 1 to determine, during start of a target process and before completion thereof in the target period, whether or not the electric power necessary for the target process can continuously secured with the surplus electric power, thereby making it possible to cause the controlled device to execute the target process without any intermission.

In addition, in the embodiment, prediction unit 12 predicts the surplus electric power generated in the target period using the history of the generated electric power in a fixed period in the past. Accordingly, prediction unit 12 can predict the surplus electric power in the future with comparatively high accuracy on the basis of the achievement of power generator 2 in the past. In other words, although the tendency of changes in the generated electric power by power generator 2 may vary for each consumer in some cases, prediction unit 12 can easily predict change in the generated electric power by the target period by being based on the achievement in the past, thereby improving the prediction accuracy of the surplus electric power.

In addition, prediction unit 12 also uses the history of the consumed electric power in the fixed period in the past, in addition to the history of the generated electric power. This further improves the prediction accuracy of the surplus electric power. In other words, although the tendency of changes in the generated electric power by power generator 2 may differ depending on the life pattern of a consumer, prediction unit 12 can easily predict change in the generated electric power by the target period by being based on the achievement in the past, thereby further improving the prediction accuracy of the surplus electric power.

Meanwhile, the controlled device controlled by load control apparatus 1 is not limited to hot water supply device 41, but may be a device as long as capable of shifting start timing of a process, for example, may be a dish washer, a washing machine, or the like. Further, the controlled device can be a device which accumulates energy such as hot water supply device 41 which accumulates thermal energy, and as an example, can be a charging device which charges a storage battery, specifically, a charging device which charges a storage battery (battery) of an electric automobile. In the case of a charging device, a target process in which a controlled device utilizes the surplus electric power to be executed is a process for accumulating electricity of a predetermined amount of electric energy.

In this manner, if a device which accumulates energy is a controlled device, time necessary for a target process can be adjusted in accordance with the amount of energy to be accumulated, thereby allowing the surplus electric power generated in a short period of time to be effectively utilized in the controlled device. In other words, in these controlled devices, even if a process is stopped in the course thereof, the energy accumulated before the process is stopped does not become useless. This allows the surplus electric power to be effectively utilized. From this regard, the device which accumulates energy is different from the device, such as a dish washer or a washing machine, in which if a process being once started is stopped in the course thereof, the process becomes useless.

In addition, a target process that a controlled device executes utilizing the surplus electric power is not necessarily a process with the power consumption to be constant all the time, but may be a process using the power consumption to be varied in the course thereof such as a series of processes form washing to drying in a washing/drying machine.

Moreover, multiple controlled devices may be set with respect to single load control apparatus 1. In this case, determination unit 13 may be configured to set multiple candidates for target processes to be determination targets, and select a target process capable of being executed among these candidates. In this case, if there are multiple target processes capable of being executed, adding an order of priority to each target process allows load control apparatus 1 to preferentially execute a target process with higher priority.

Further, if the surplus electric power enough to execute a target process at multiple times in a single target period can be secured, load control apparatus 1 may control a controlled device so as to execute a target process at multiple times in a single target period. Here, when the target process is executed at multiple times in the single target period, load control apparatus 1 may control controlled device so as to continuously execute the target process for the multiple times, instead of causing the target process to be finished every time. For example, when a target process is an additional boiling process of 100 L of hot water in hot water supply device 41, load control apparatus 1 controls an operation of hot water supply device 41 such that after an additional boiling process of 100 L of hot water is executed in the target period, an additional boiling process of 100 L of hot water is further executed without any intermission.

(Second Embodiment)

Figure 3:
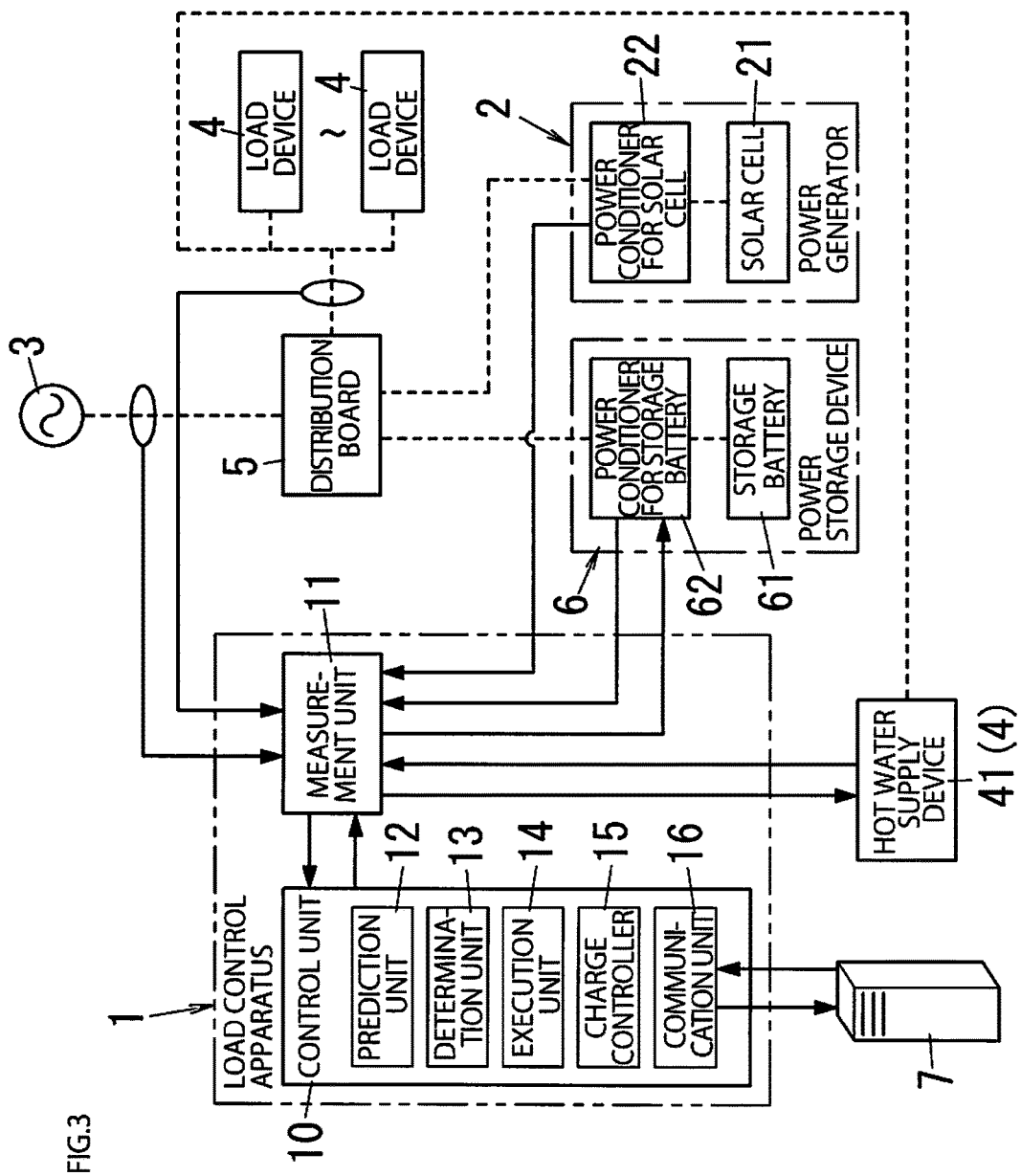
FIG. 3 is a schematic configuration block diagram illustrating a power supply system according to a second embodiment.

Load control apparatus 1 in a second embodiment is different from load control apparatus 1 in the first embodiment in that load control apparatus 1 is connected to power storage device 6 and server 7, as illustrated in FIG. 3. Hereinafter, common reference numerals are given to the configuration similar to that of the first embodiment, and an explanation thereof is omitted as appropriate.

Power storage device 6 includes storage battery 61, which stores therein the generated electric power by power generator 2, and power conditioner for storage battery (illustrated in FIG. 3 as "POWER CONDITIONER FOR STORAGE BATTERY) 62 inserted between storage battery 61 and distribution board 5.

Power conditioner 62 charges and discharges storage battery 61. In other words, power conditioner 62 charges storage battery 61 during the daytime by the output from solar cell 21, and converts the electric power accumulated in storage battery 61 into alternating-current power by an inverter circuit (not illustrated) and outputs the alternating-current power during the night, for example. An output of power conditioner 62 is connected to distribution board 5, which is installed in the house and is connected with load devices 4, and the generated electric power by solar cell 21 is supplied to load devices 4 via power conditioner 62 and distribution board 5.

In load control apparatus 1 is configured such that measurement unit 11 is able to communicate with power conditioner 62 in power storage device 6. Measurement unit 11 communicates with power conditioner 62 in power storage device 6 to acquire the residual amount of storage battery 61 (the residual amount of electric power), information such as the specifications, errors (abnormality), or the like, of storage battery 61 and power conditioner 62, from power conditioner 62. In this manner, measurement unit 11 measures the residual amount of power storage device 6.

Control unit 10 includes charge controller 15, which transmits a charge-and-discharge signal to power conditioner 62 in power storage device 6 byway of measurement unit 11 to control charging and discharging storage battery 61. In the embodiment, upon reception of data from measurement unit 11, control unit 10 firstly determines, before prediction of the surplus electric power in prediction unit 12 and determination of execution propriety in determination unit 13, the propriety of charging storage battery 61 on the basis of the measurement result by measurement unit 11.

In other words, control unit 10 determines whether or not power selling to an electric power company is possible when the surplus electric power is generated, and if determining that the power selling is impossible, and determines the propriety of charging storage battery 61 depending on whether or not the residual amount of storage battery 61 is less than a predetermined charge threshold value, in charge controller 15. In this time, if the residual amount of storage battery 61 is less than the charge threshold value 18, control unit 10 transmits a charge-and-discharge signal for start of a charge from charge controller 15 to power conditioner 62 by way of measurement unit 11 to cause power conditioner 62 to start the charge with the surplus electric power.

On the other side, if the residual amount of storage battery 61 is equal to or more than the charge threshold value, control unit 10 transmits a charge-and-discharge signal for non-permission of charge from charge controller 15 to power conditioner 62 by way of measurement unit 11, and shifts to prediction in prediction unit 12 and determination in determination unit 13. In other words, when the surplus electric power is generated, load control apparatus 1 in the embodiment gives higher priority to the charge of power storage device 6 than hot water supply device 41, as a method of utilizing the surplus electric power.

Power storage device 6 having received the charge-and-discharge signal from load control apparatus 1 determines whether or not the charge of storage battery 61 is executed in accordance with the content of the charge-and-discharge signal. Upon reception of the charge-and-discharge signal for start of the charge, power storage device 6 starts the charge of storage battery 61, while the upon reception of the charge-and-discharge signal for non-permission of the charge, power storage device 6 shifts to a non-permission mode in which the charge of storage battery 61 is prohibited.

Server 7 is connected to a public network, such as the Internet, and is load control connected to apparatus 1 via the public network. Server 7 acquires weather information (including achievements in the past and forecasts in the future) from a weather information server (not illustrated) on the public network, on a periodic basis. Here, server 7 can set an area to be a target in advance setting, and acquires weather information relating to the set area. Further, the weather information includes at least categories of "sunny", "cloudy", and "rain", and may include, in addition to these categories, the temperature or the condition of wind.

In load control apparatus 1, control unit 10 is provided with communication unit 16, which communicates with server 7. Here, measurement unit 11 transmits, to server 7 from communication unit 16 in control unit 10, a history of the generated electric power measured in the past and a history of the consumed electric power, as history information, on a periodic basis (for example, interval of ten minutes) to house the history information in server 7. In this time, server 7 stores therein, as exemplified in Table 2 below, the received history information in each time band in association with weather information on that day, as a history table. In other words, server 7 stores therein history information (consumed electric power (CEP) and generated electric power (GEP)) in accordance with the weather categories of "sunny", "cloudy", and "rain". Further, in Table 2, history information obtained by averaging each of the generated electric power and the consumed electric power (CEP) for every ten minutes.

TABLE 2

| Date | Weather information | Type of information | | Average electric power for every ten minutes | | | | |
| --- | --- | --- | --- | --- | --- | --- | --- | --- |
| | | | | 11:00~ 11:10 | 11:10~ 11:20 | 11:20~ 11:30 | 11:30~ 11:40 | |
| March 9 | Rain | CEP (kW) | ... | 0.1 | 3.5 | 1.2 | 0.5 | ... |
| | | GEP (kW) | ... | 0 | 0 | 0 | 0 | ... |
| March 10 | Rain | CEP (kW) | ... | 0.3 | 3 | 1 | 0.5 | ... |
| | | GEP (kW) | ... | 0 | 0 | 0 | 0 | ... |
| March 11 | Rain | CEP (kW) | ... | 0.5 | 3.1 | 0.9 | 0.4 | ... |
| | | GEP (kW) | ... | 0 | 0 | 0 | 0 | ... |
| March 12 | Rain | CEP (kW) | ... | 0.1 | 3.6 | 0.4 | 0.4 | ... |
| | | GEP (kW) | ... | 0 | 0 | 0 | 0 | ... |
| March 13 | Cloudy | CEP (kW) | ... | 0.5 | 3.4 | 0.9 | 0.4 | ... |
| | | GEP (kW) | ... | 0 | 2 | 2 | 0.5 | ... |
| March 14 | Sunny | CEP (kW) | ... | 0.3 | 3.6 | 1 | 0.4 | ... |
| | | GEP (kW) | ... | 0.1 | 2 | 1.4 | 0.6 | ... |
| March 15 | Cloudy | CEP (kW) | ... | 0.2 | 3.4 | 3.1 | 0.3 | ... |
| | | GEP (kW) | ... | 0.1 | 2 | 1.4 | 0.6 | ... |
| March 16 | Sunny | CEP (kW) | ... | 0.3 | 3.3 | 3 | 0.5 | ... |
| | | GEP (kW) | ... | 0.1 | 2 | 1.4 | 0.7 | ... |
| March 17 | Cloudy | CEP (kW) | ... | 0.3 | 3.2 | 2.9 | 0.6 | ... |
| | | GEP (kW) | ... | 0.9 | 1.4 | 1 | 1 | ... |
| March 18 | Rain | CEP (kW) | ... | 0.1 | 3.1 | 2.1 | 0.5 | ... |
| | | GEP (kW) | ... | 0 | 0 | 0 | 0 | ... |
| March | Rain | CEP (kW) | ... | 0.5 | 3.5 | 3.2 | 0.5 | ... |

TABLE 2-continued

| Date | Weather information | Type of information | ... | 11:00~11:10 | 11:10~11:20 | 11:20~11:30 | 11:30~11:40 | ... |
|---|---|---|---|---|---|---|---|---|
| 19 March | Sunny | GEP (kW) | ... | 0 | 0 | 0 | 0 | ... |
|  |  | CEP (kW) | ... | 0.7 | 3.1 | 2.8 | 0.5 | ... |
| 20 March | Cloudy | GEP (kW) | ... | 0.1 | 2 | 1.3 | 0.3 | ... |
|  |  | CEP (kW) | ... | 0.5 | 3.2 | 2.9 | 0.4 | ... |
| 21 March | Rain | GEP (kW) | ... | 0.3 | 2 | 0.7 | 0.5 | ... |
|  |  | CEP (kW) | ... | 0.3 | 3.1 | 2.8 | 0.5 | ... |
| 22 March | Sunny | GEP (kW) | ... | 0 | 0 | 0 | 0 | ... |
|  |  | CEP (kW) | ... | 0.2 | 3 | 2.7 | 0.5 | ... |
| 23 March |  | GEP (kW) | ... | 0.1 | 1.9 | 1.4 | 0.7 | ... |

Meanwhile, prediction unit 12 in control unit 10 acquires, from server 7 via communication unit 16, at least history information corresponding to weather information (forecast) in a target period. In the embodiment, prediction unit 12 acquires on a periodic basis, from server 7, weather information (forecast) in a target period and a history table in a certain period in the past (for example, for two weeks). Prediction unit 12 extracts history information corresponding to the weather information in the target period from the history table, and predicts the surplus electric power generated in the target period on the basis of the extracted history information. In short, if the weather information (forecast) in the target period is "rain", prediction unit 12 extracts history information corresponding to "rain" from the history table, and predicts the surplus electric power in the target period on the basis of the history information.

Next, an operation of control unit 10 of the configuration described above is described with reference to FIG. 4. The operation of control unit 10 is basically similar to the operation in FIG. 2 explained in the first embodiment, other than S12 to S15, S18, S19, and S24 in FIG. 4. Here, in the example of table 2, an example in which at 23:00 on 23rd March, a target period is set to next 24 hours (at 23:00 on 24th) is described.

Upon reception of data of from measurement unit 11 (S11: yes), control unit 10 determines whether or not it is transmission timing of data (history information) to server 7 (S12), and if the transmission timing, transmits the data acquired from measurement unit 11 to server 7 (S13). If it is not the transmission timing or transmission of the data to server 7 that is completed, control unit 10 determines whether or not it is reception timing of data (weather information and history table) from server 7 (S14), and if it is the reception timing, receives data from server 7 (S15).

If it is not the reception timing or reception of the data from server 7 that is completed, control unit 10 firstly determines the presence or absence of the current surplus electric power on the basis of data (measurement result) from measurement unit 11 (S16). In this time, if the generated electric power is more than the consumed electric power, control unit 10 determines that the surplus electric power is present (S16: yes), and successively determines propriety of power selling to an electric power company (S17).

If it determines that the power selling is impossible (S17: yes), control unit 10 compares the residual amount of storage battery 61 with a charge threshold value, in charge controller 15 (S18), and if the residual amount is equal to or more than the charge threshold value (S18: yes), transmits a charge-and-discharge signal for non-permission of charge to power storage device 6 (S19). After transmitting the charge-and-discharge signal for non-permission of charge, control unit 10 predicts the surplus electric power to be generated a target period in the future for every unit time, in prediction unit 12 (S20).

In this time, if in the weather information (forecast) received by control unit 10 from server 7, the weather in the target period (at 23:00 on 23rd to at 23:00 on 24th) is "rain", prediction unit 12 uses history information corresponding to "rain" in the history table to predict the surplus electric power in the target period. Here, because the current time and date is at 23:00 on March 23, history information on past seven rainy days is history information on March 9, 10, 11, 12, 18, 19, and 22, at 00:00 to 23:00. In the example of Table 2, for example, an average value at 11:00 to 11:10 in the past seven rainy days is 0.27 kW for the consumed electric power, and 0 kW for the generated electric power. Accordingly, prediction unit 12 predicts the consumed electric power as 0.27 kW and the generated electric power as 0 kW, at 11:00 to 11:10 on 24th included in the target period.

In this manner, prediction unit 12 predicts the consumed electric power and the generated electric power, from the beginning (at 23:00 on 23rd) to the last (at 23:00 on 24th) in the target period, for every unit time (here, ten minutes), on the basis of the history information of the same weather to predict the surplus electric power. Further, the history information that prediction unit 12 uses to predict the surplus electric power is not limited to for seven days, but can be arbitrarily set within the range included in the history table, such as three days or one month.

Control unit 10 then compares the necessary electric power for every unit time after hot water supply device 41 starts the target process and before completing with the prediction result by prediction unit 12 for every unit time, in determination unit 13 (S21), and determines propriety that hot water supply device 41 executes the target process with the surplus electric power in the target period (S22). In this time, if the prediction result by prediction unit 12 (the surplus electric power) is equal to or more than an electric power threshold value over the target period, control unit 10 determines that the target process can be executed, in determination unit 13 (S22: yes). In this case, control unit 10 transmits a control signal for start of the process from execution unit 14 hot water supply device 41 by way of measurement unit 11 (S23).

In contrast, if the determining is that no surplus electric power is present (S16: no), if the determining is that the power selling is possible (S17: no), or if the determining is that the target process cannot be executed (S22: no), control unit 10 transmits a control signal for non-permission of the process to hot water supply device 41 (S25). Moreover, if the residual amount is less than the charge threshold value less than at S18 (S18: no), control unit 10 transmits a charge-and-discharge signal for start of the charge to power storage device 6 (S24), and then transmits a control signal for non-permission of the process to hot water supply device 41 (S25).

Control unit 10 repeatedly executes the abovementioned S11 to S25.

With load control apparatus 1 explained above, charge controller 15 charges storage battery 61 the surplus electric power, even if the surplus electric power is generated, as long as the residual amount of storage battery 61 is less than the predetermined charge threshold value. Accordingly, hot water supply device 41 is charged with higher priority than storage battery 61, as a method of utilizing the surplus electric power. In other words, charge controller 15 uses, if power storage device 6 can be charged with the surplus electric power, the surplus electric power to charge power storage device 6 with higher priority than hot water supply device 41, thereby allowing the surplus electric power to be effectively utilized.

Moreover, in the embodiment, prediction unit 12 predicts the surplus electric power in the target period on the basis of history information corresponding to the weather information (forecast) in the target period, acquired from server 7. This allows the surplus electric power in the future to be predicted with high accuracy predicts. In other words, when power generator 2 includes a device, such as solar cell 21, which uses the natural energy (solar light) to generate the electric power, so that the generated electric power is changed depending to the weather, the generated electric power, the trend of the consumed electric power is larger influenced by the weather. Accordingly, prediction unit 12 predicts the generated electric power and the consumed electric power on the basis of history information of the same weather as the target period, thereby resulting in the improved prediction accuracy of the surplus electric power.

Further, when power generator 2 includes, for example, a wind power generator, instead of solar cell 21, weather information includes the direction of the wind or the velocity of the wind, and prediction unit 12 may predict the surplus electric power for each direction of the wind or each velocity of the wind. In this manner, information included in the weather information is set as appropriate in accordance with power generator 2.

Meanwhile, load control apparatus 1 in the embodiment may be configured to, instead of transmitting history information to server 7, similar to the first embodiment, store history information in a fixed period in the past (for example, one week) in measurement unit 11 itself. In this case, load control apparatus 1 acquires only weather information (forecast) in the target period from server 7, and prediction unit 12 predicts the surplus electric power generated in the target period using the generated electric power by solar cell 21 in the target period predicted on the basis of the acquired weather information.

In other words, even if the history information in the past is not in associated with the weather, if load control apparatus 1 can specify the weather in the target period on the basis of the weather information received from server 7, the prediction accuracy of the generated electric power by power generator 2 in the target period is improved, compared with a case where the weather in the target period is unknown. Accordingly, there is an advantage in that while load control apparatus 1 restricts a burden in the calculation process in prediction unit 12, allowing the accuracy of the surplus electric power in the target period to some extent to be expected.

Other configurations and functions are similar to the first embodiment.

(Third Embodiment)

Load control apparatus 1 in an embodiment is different from load control apparatus 1 in the first embodiment in that a target process to be a determination target in determination unit 13 is a process to be completed from start within a constant fixed period of time. Hereinafter, common reference numerals are given to the configuration similar to that of the first embodiment, and an explanation thereof is omitted as appropriate.

In the embodiment, load control apparatus 1 uses a fixed period of time necessary for the target process as the reference to perform prediction of the surplus electric power in prediction unit 12 and determination of execution propriety in determination unit 13. In other words, prediction unit 12 sets a period from the present until a fixed period of time elapses as a target period, for the every fixed period of time, and predicts the surplus electric power in the target period. Determination unit 13 compares, for the every fixed period of time, the electric power necessary for the target process in hot water supply device 41 as the controlled device with the prediction result by prediction unit 12.

In other words, in the embodiment, both of the time length of the time interval (unit time) that prediction unit 12 predicts the surplus electric power and that of the target period which is a prediction target of the surplus electric power are set to the same as the time length of the target process (fixed period of time). Accordingly, load control apparatus 1 predicts surplus electric power and before the next fixed period of time for every fixed period of time, determines whether or not hot water supply device 41 can execute the target process can be executed with the surplus electric power.

For example, assuming the hot water supply device 41 consumes the electric power of 450 W all the time when boiling hot water, and a fixed period of time is ten minutes, determination unit 13 determines propriety for the target process depending on whether or not the surplus electric power 450 W or more is secured over ten minutes from now on. Specifically, load control apparatus 1 predicts the surplus electric power for ten minutes hereafter, for every fixed period of time (ten minutes), in prediction unit 12, and compares the electric power necessary for the target process in hot water supply device 41 as the controlled device with the prediction result by prediction unit 12, in determination unit 13. In this time, determination unit 13 compares an electric power threshold value (500 W) in which a predetermined margin is added to a value of electric power necessary for the target process with the prediction result by prediction unit 12 (the surplus electric power), and if the prediction result is equal to or more than the electric power threshold value, determines that the electric power necessary for the target process can be secured, and the target process can be executed.

In other words, in this case, hot water supply device 41 specifies the content of the target process not by the amount of hot water to be boiled but by the time (fixed period of time) during which the additional boiling process is continued. As a result, hot water supply device 41 executes the additional boiling process for the fixed period of time (ten minutes) as the minimum unit. Accordingly, when determination unit 13 determines that the target process can be executed, hot water supply device 41 executes the target process over the fixed period of time from the start to the finish of the target period. In addition, at the time when the target period is finished, load control apparatus 1 predicts the surplus electric power in a next target period and determines propriety for the target process. Accordingly, when the determining is that the target process is continuously possible in multiple target periods, load control apparatus 1 can cause hot water supply device 41 to execute the target process without any intermission. In other words, when the sufficient surplus electric power is continuously generated, load control apparatus 1 controls the operation of hot water supply device 41 such that after executing an additional boiling process is executed for ten minutes in the target period, hot water supply device 41 executes an additional boiling process for ten minutes in a next target period without any intermission.

Further, the fixed period of time is not limited to ten minutes, but may be arbitrarily set, for example, one minute, five minutes, or thirty minutes.

Moreover, at a set time decided in advance once a day, determination unit 13 obtains the electric power necessary for the target process using a history of the electric power that hot water supply device 41 consumed when actually executing the target process in a fixed period in the past. Determination unit 13 updates the electric power necessary for the target process for every set time, and determines propriety for execution of the target process using the latest information (electric power) all the time. If specifically described, control unit 10 calculates, at the set time, a value of time average from the amount of electric power that hot water supply device 41 used when actually executing the additional boiling process in the latest constant period, and sets the value as the electric power necessary for the target process.

In this manner, determination unit 13 obtains the electric power necessary for the target process on the basis of the history of the electric power required for the latest actual process. Accordingly, determination unit 13 can determine propriety for execution of the target process using a value close to the actual electric power necessary for the target process to which an influence such as the season or the use pattern by a user is added. Therefore, there is an advantage in that load control apparatus 1 has a higher reliability of the determination of execution propriety for the target process in determination unit 13, compared with a case where a value of the electric power necessary for the target process is fixed.

Meanwhile, in the embodiment, load control apparatus 1 does not always perform determination of execution propriety for the target process in determination unit 13, and does not perform determination of execution propriety in a case below.

In other words, while hot water supply device 41 is executing a target process in accordance with a control signal from execution unit 14, when the power purchasing measured in measurement unit 11 exceeds a predetermined threshold value of power purchasing, control unit 10 forcedly stops the target process, and does not perform determination of execution propriety for a while thereafter. Specifically, control unit 10 includes a process stop unit (not illustrated) which immediately stops, while hot water supply device 41 is executing a target process in accordance with a control signal from execution unit 14, when the purchased electric power exceeds a predetermined threshold value of power purchasing, the target process.

The process stop unit compares, for example, the amount of electric power of the power purchasing (which is reset to 0 for every fixed period of time) measured in measurement unit 11 with a threshold value of power purchasing, and when the amount of electric power of the power purchasing exceeds the threshold value of power purchasing, causes hot water supply device 41 to stop the target process by a control signal for non-permission of a process. Thereafter, and before the amount of electric power of the power purchasing is reset to fall less than the threshold value of power purchasing, control unit 10 does not perform determination of execution propriety in determination unit 13. Further, because the amount of electric power of the power purchasing is reset to 0 for every fixed period of time, even if the amount of electric power of the power purchasing exceeds a threshold value of power purchasing in a certain target period, the amount of electric power of the power purchasing is reset at the time when the target period is finished, and load control apparatus 1 determines propriety for the target process in a next target period.

Moreover, control unit 10 does not perform determination of execution propriety in determination unit 13 when hot water supply device 41 receives a manipulation input for starting an additional boiling process in a hot-water supply controller as a manipulation unit which receives a manipulation input by a user, and executes the additional boiling process (target process).

In other words, when hot water supply device 41 as the controlled device starts an additional boiling process not by a control signal from load control apparatus 1 but also by a direct manipulation by a user, priority is given to the manipulation by the user. In other words, if starting an additional boiling process by a manipulation by a user, hot water supply device 41 does not start or stoop the target process by a control signal from load control apparatus 1 before the additional boiling process is completed.

Load control apparatus 1 explained above executes a target process when it is determined that the electric power necessary for the target process can be secured with the surplus electric power in a next fixed period of time, for every fixed period of time. This can prevent the surplus electric power can be prevented from run out after hot water supply device 41 starts a target process before completing. In particular, if the short fixed period of time is set, load control apparatus 1 predicts generation of the surplus electric power in a relatively short span, and if the sufficient surplus electric power is generated, can utilize the sufficient surplus electric power for the target process, thereby resulting in the high utilization efficiency of the surplus electric power.

Moreover, in the embodiment, while hot water supply device 41 is executing a target process, if the power purchasing exceeds a predetermined threshold value of power purchasing, control unit 10 forcedly stops the target process. Accordingly, in such a case where the surplus electric power is little against the prediction in prediction unit 12, a loss due to increase in the power purchasing can be reduced. In other words, in such a case where load control apparatus 1 predicts that the sufficient surplus electric power is generated in prediction unit 12 and causes hot water supply device 41 to start a target process, however, the sufficient surplus electric power cannot be obtained because the prediction of the generated electric power and the consumed electric power has failed, load control apparatus 1 is forced to purchase electricity for the target process in some cases. If hot water supply device 41 is caused to continue the target process with the power purchasing, the power purchasing might increase uselessly, thereby causing a loss for a user. However, in such a case, load control apparatus 1 stops the target process to suppress increase in the power purchasing to allow a loss to be suppressed to the minimum, as a result.

In addition, when hot water supply device 41 starts a process by a manipulation by a user load control apparatus 1, load control apparatus 1 does not start or stop the target process by a control signal before the process is completed. Accordingly, priority is given to the manipulation by the user, thereby improving the convenience of the user. In other words, while hot water supply device 41 performs an operation started by a manipulation by a user, load control apparatus 1 does not stop the process in the course thereof regardless of the presence or absence of the surplus electric power.

Other configurations and functions are similar to the first embodiment.

Further, the configuration explained in the third embodiment may be applied in combination with the configuration explained in the second embodiment.

A program that realizes load control as described above may be stored on a non-transitory computer readable medium. The program stored in the recording medium is read into a system, such as computer, so that the above-described load control can be realized by executing the program while controlling the system. The medium includes such devices as a memory device, magnetic disk device, and an optical disk device, that are able to record the program. For example, the recording medium could be Blu-Ray disk CD-ROM (Compact Disc, read only memory), DVD (Digital Versatile Disc), ZIP disc, JAZ disc, MO (Magneto-optical) disc, DAT (Digital Audio Tape), or the like.

The invention claimed is:

1. A load control apparatus used in a power supply system in which a power generator supplies electric power to a load device, and when electric power generated in the power generator is insufficient to supply the electric power to the load device, a commercial power system supplies electric power to the load device, the load control apparatus comprising:
    a controller configured to receive information regarding consumed electric power in the load device and generated electric power by the power generator and to control an operation of a controlled device included in the load device on the basis of the received information, wherein
    the controller comprises:
        a determination unit configured to determine whether a condition related to electric power is satisfied;
        an execution unit configured to control the operation of the controlled device to start execution of a predetermined process in the controlled device, when the determination unit determines that the condition related to the electric power is satisfied; and
        a prediction unit configured to predict a surplus electric power generated in a target period from the present time until a predetermined period of time elapses,
    the determination unit is configured to:
        determine that the condition is satisfied when the determination unit determines that the electric power necessary for executing the predetermined process will be continuously secured from the start to the completion of the predetermined process in the target period,
        compare electric power and time necessary after the controlled device starts the predetermined process and before completing with a prediction result by the prediction unit, the predetermined process comprises a process to be started and completed within a constant fixed period of time,
the prediction unit is further configured to predict, for the constant fixed period of time, a period from the present time until the constant fixed period of time elapses as the target period, the surplus electric power in the target period, and
the determination unit is further configured to compare, for the constant fixed period of time, the electric power necessary for the process in the controlled device with the prediction result by the prediction unit.

2. The load control apparatus according to claim 1, further comprising a measurement unit configured to measure consumed electric power in the load device and generated electric power by the power generator and to provide a measurement result to the controller.

3. The load control apparatus according to claim 2, wherein
    the measurement unit measures the electric power supplied from the commercial power system to the load device as purchased electric power, and
    the controller further includes a process stop unit configured to stop the process when the purchased electric power exceeds a predetermined threshold value of power purchasing while the controlled device is executing the process in accordance with the control signal from the execution unit.

4. The load control apparatus according to claim 2, wherein:
    the power supply system is provided with a power storage device configured to store therein the generated electric power by the power generator,
    the measurement unit measures a residual amount of the power storage device, and
    the controller further includes a charge controller configured to control, when the residual amount of the power storage device is less than a predetermined charge threshold value and the surplus electric power is generated, the power storage device to charge the power storage device with the surplus electric power, and performs the prediction in the prediction unit and the determination in the determination unit when the residual amount of the power storage device is equal to or more than the charge threshold value.

5. The load control apparatus according to claim 1, wherein the determination unit compares electric power and time necessary after the controlled device starts the predetermined process and before completing a prediction result.

6. The load control apparatus according to claim 1, wherein, the surplus electric power comprises a difference between the generated electric power and the consumed electric power when the generated electric power is more than the consumed electric power or an electric power forbidden to be sold being a difference between the generated electric power and the consumed electric power when the generated electric power is more than the consumed electric power.

7. The load control apparatus according to claim 6, wherein the prediction unit predicts, for every unit time shorter than the time required from the start of the process to the completion thereof, the surplus electric power in the target period, and the determination unit compares, for the every unit time, the electric power necessary for the process in the controlled device with the prediction result by the prediction unit.

8. The load control apparatus according to claim 6, wherein the prediction unit predicts the surplus electric power generated in the target period using a history of the generated electric power in a fixed period in the past.

9. The load control apparatus according to claim 6, wherein the prediction unit predicts the surplus electric power generated in the target period using a history of the generated electric power and a history of the consumed electric power in a fixed period in the past.

10. The load control apparatus according to claim 6, wherein:
the load control apparatus further comprises a communication unit configured to communicate with a server, and
the power generator includes a solar cell, and
the prediction unit acquires weather information in the target period from the server via the communication unit, and predicts the surplus electric power generated in the target period using generated electric power by the solar cell in the target period predicted from the weather information.

11. The load control apparatus according to claim 6, wherein:
the load control apparatus further comprises a communication unit configured to communicate with a server, and
the power generator includes a solar cell,
a measurement unit stores the history of the generated electric power and the history of the consumed electric power measured in the past in association with weather information in the server, and
the prediction unit acquires, from the server via the communication unit, the history of the generated electric power and the history of the consumed electric power corresponding to the weather information in the target period, and predicts the surplus electric power generated in the target period on the basis of the histories.

12. The load control apparatus according to claim 1, wherein the determination unit obtains the electric power necessary for the process in the controlled device, using a history of the electric power used by the controlled device for the latest process.

13. The load control apparatus according to claim 1, wherein:
the controlled device includes a manipulation unit configured to receive a manipulation input for starting the process, and
when the controlled device starts the process in accordance with the manipulation in the manipulation unit, the controller does not perform the determination in the determination unit before the process is completed.

14. A load control system comprising:
the load control apparatus according to claim 1; and
the controlled device.

15. A non-transitory computer-readable recording medium storing a program readable by a computer in a power supply system in which a power generator supplies electric power to a load device, and when electric power generated in the power generator is insufficient, a commercial power system supplies electric power to the load device, the computer being used to control an operation of a controlled device included in the load device on the basis of information regarding consumed electric power in the load device and generated electric power by the power generator, the program, when executed by the computer, causing the computer to function as:

a determination unit configured to determine whether a condition related to electric power is satisfied;
an execution unit configured to control the operation of the controlled device to start a predetermined process, when the determination unit determines that the condition related to the electric power is satisfied; and
a prediction unit configured to predict a surplus electric power generated in a target period from the present time until a predetermined period of time elapses, wherein
the program causes the computer to function as the determination unit such that the determination unit is further configured to:
determine that the condition related to the electric power is satisfied, when the determination unit determines that electric power necessary for the process will be continuously secured from the start to the completion of the process in a target period from the present until a predetermined period of time elapses,
compare electric power and time necessary after the controlled device starts the predetermined process and before completing with a prediction result by the prediction unit,
the predetermined process comprises a process to be started and completed within a constant fixed period of time,
the program causes the computer to function as the prediction unit such that the prediction unit is further configured to predict, for the constant fixed period of time, a period from the present time until the constant fixed period of time elapses as the target period, the surplus electric power in the target period, and
the program causes the computer to function as the determination unit such that the determination unit is further configured to compare, for the constant fixed period of time, the electric power necessary for the process in the controlled device with the prediction result by the prediction unit.

16. A load control method, comprising:
receiving information regarding consumed electric power in a load device and generated electric power by a power generator and controlling the operation of a controlled device included in the load device on the basis of the received information;
determining whether a condition related to electric power is satisfied;
controlling the operation of a controlled device included in the load device to start a predetermined process, when a determining result of the determining step is that the condition related to the electric power is satisfied; and
predicting a surplus electric power generated in a target period from the present time until a predetermined period of time elapses
comparing electric power and time necessary after the controlled device starts the predetermined process and before completing with a prediction result by the prediction unit, wherein
determining whether the condition related to the electric power is satisfied comprises determining that the condition related to the electric power is satisfied, when it is determined that electric power necessary for the process will be continuously secured from the start to the completion of the process in a target period from the present until a predetermined period of time elapses, the predetermined process comprises a process to be started and completed within a constant fixed period of time, and the method further comprises:

predicting, for the constant fixed period of time, a period from the present time until the constant fixed period of time elapses as the target period, the surplus electric power in the target period, and comparing for the constant fixed period of time, the electric power necessary for the process in the controlled device with the prediction result by the prediction unit.

17. The method according to claim 16, wherein the controlled device is an electric type hot water supply device, and the process is a process for boiling a predetermined amount of hot water.

18. The method according to claim 16, wherein the controlled device is a charging device configured to charge a storage battery, and the process is a process for accumulating a predetermined amount of electric energy.

* * * * *